US012691649B2

(12) United States Patent  
Minervino et al.

(10) Patent No.: US 12,691,649 B2  
(45) Date of Patent: Jul. 28, 2026

(54) METHOD FOR PRODUCING A PART, IN PARTICULAR A PART MADE FROM A COMPOSITE MATERIAL

(71) Applicants: SAFRAN, Paris (FR); SAFRAN AIRCRAFT ENGINES, Paris (FR)

(72) Inventors: Mattéo Minervino, Moissy-Cramayel (FR); Didier Fromonteil, Moissy-Cramayel (FR); Bénédicte Le Borgne, Moissy-Cramayel (FR); Gurvan Moreau, Moissy-Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 77 days.

(21) Appl. No.: 18/719,422

(22) PCT Filed: Dec. 2, 2022

(86) PCT No.: PCT/FR2022/052222  
§ 371 (c)(1),  
(2) Date: Jun. 13, 2024

(87) PCT Pub. No.: WO2023/111419  
PCT Pub. Date: Jun. 22, 2023

(65) Prior Publication Data  
US 2025/0065577 A1 Feb. 27, 2025

(30) Foreign Application Priority Data  
Dec. 13, 2021 (FR) ...................................... 2113390

(51) Int. Cl.  
B29C 70/48 (2006.01)  
B29C 70/86 (2006.01)  
(Continued)

(52) U.S. Cl.  
CPC .............. B29C 70/48 (2013.01); B29C 70/86 (2013.01); B29D 99/0028 (2013.01);  
(Continued)

(58) Field of Classification Search  
CPC ..... B29C 70/682; B29C 70/683; B29C 70/72; B29C 70/688; B29C 33/76  
See application file for complete search history.

(56) References Cited

U.S. PATENT DOCUMENTS

| | | | |
|---|---|---|---|
| 1,155,336 A | 10/1915 | Buckwalter | |
| 3,028,292 A * | 4/1962 | Hinds ................... | B29C 70/742 |
| | | | 416/241 A |

(Continued)

FOREIGN PATENT DOCUMENTS

| | | |
|---|---|---|
| FR | 3107299 A1 | 8/2021 |
| WO | 2006136755 A2 | 12/2006 |
| WO | 2021160961 A1 | 8/2021 |

OTHER PUBLICATIONS

Search Report and Written Opinion issued in International Application No. PCT/FR2022/052222, mailed Mar. 14, 2023.

(Continued)

*Primary Examiner* — Matthew J Daniels  
(74) *Attorney, Agent, or Firm* — Bookoff McAndrews, PLLC

(57) ABSTRACT

A method for producing a part, in particular a part made of composite material, in particular for a turbomachine, including at least: a step of producing a preform, during which a fibrous preform intended to form an outer skin of the part is produced; a step of producing a core, during which a rigid core, in particular a hollow rigid core, intended to form a framework of the part is produced; an insertion step, during which the rigid core is inserted into the fibrous preform, an injection step, during which a matrix is injected into the (Continued)

fibrous preform; and a heat-treatment step, during which polymerisation of the matrix is carried out.

16 Claims, 5 Drawing Sheets

(51) Int. Cl.
    *B29D 99/00*         (2010.01)
    *B29K 71/00*         (2006.01)
    *B29K 77/00*         (2006.01)
    *B29K 79/00*         (2006.01)

(52) U.S. Cl.
    CPC ...... *B29K 2071/12* (2013.01); *B29K 2077/00* (2013.01); *B29K 2079/085* (2013.01)

(56) References Cited

U.S. PATENT DOCUMENTS

| | | | | |
|---|---|---|---|---|
| 3,967,996 | A * | 7/1976 | Kamov | B29C 49/44 |
| | | | | 244/17.11 |
| 4,213,739 | A * | 7/1980 | Euler | B29D 99/0025 |
| | | | | 416/226 |
| 4,214,932 | A * | 7/1980 | Van Auken | F16C 3/023 |
| | | | | 156/215 |
| 4,268,571 | A * | 5/1981 | McCarthy | B29D 99/0025 |
| | | | | 428/307.3 |
| 4,278,401 | A * | 7/1981 | Martinelli | F03D 1/0675 |
| | | | | 416/241 A |
| 4,335,182 | A * | 6/1982 | Brand | B29C 44/3496 |
| | | | | 428/319.3 |
| 4,383,955 | A * | 5/1983 | Rubio | B63B 32/57 |
| | | | | 441/74 |
| 4,935,277 | A * | 6/1990 | Le Balc'h | B64C 27/473 |
| | | | | 428/116 |
| 5,222,297 | A * | 6/1993 | Graff | B29C 70/865 |
| | | | | 29/889.7 |
| 5,392,514 | A * | 2/1995 | Cook | B29D 99/0028 |
| | | | | 29/889.7 |
| 8,753,091 | B1 * | 6/2014 | Braley | F03D 13/10 |
| | | | | 416/226 |
| 2011/0318513 | A1 * | 12/2011 | Marsal | B29B 11/16 |
| | | | | 428/35.7 |
| 2012/0003101 | A1 * | 1/2012 | Schibsbye | B29C 70/48 |
| | | | | 428/441 |
| 2013/0017093 | A1 * | 1/2013 | Coupe | B29B 11/16 |
| | | | | 416/230 |
| 2014/0161621 | A1 | 6/2014 | Kray et al. | |
| 2019/0077111 | A1 * | 3/2019 | Robrecht | B32B 3/12 |
| 2019/0195073 | A1 * | 6/2019 | Sakala | B29C 70/70 |

OTHER PUBLICATIONS

Search Report issued in French Application No. 2113390, mailed Jul. 13, 2022.

* cited by examiner

[Fig. 1]
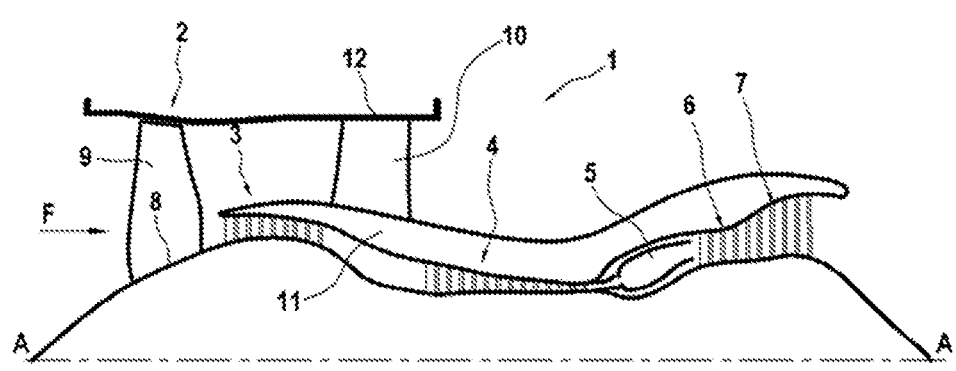
[Fig. 2]
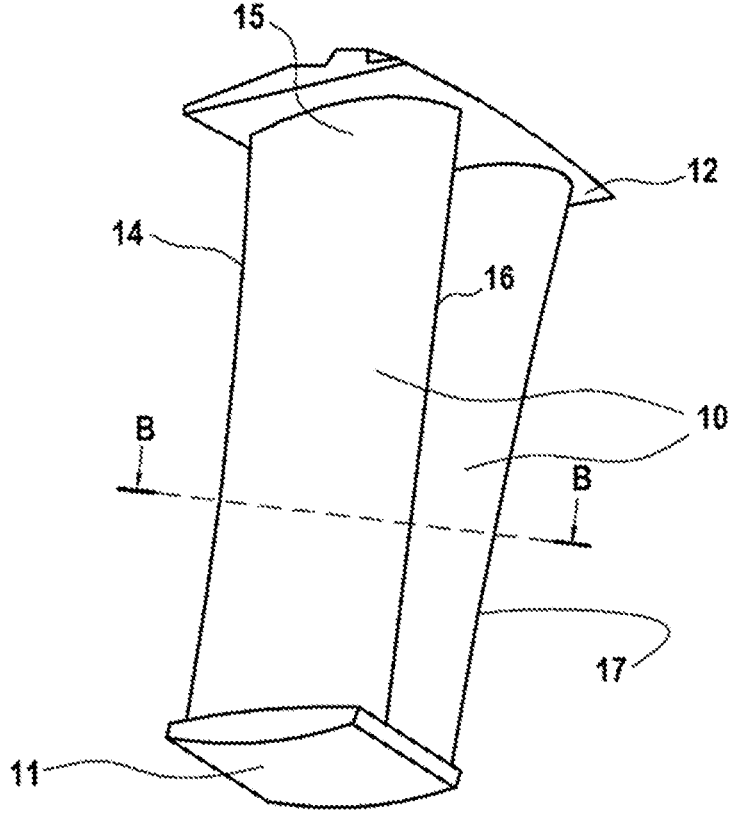

[Fig. 3]
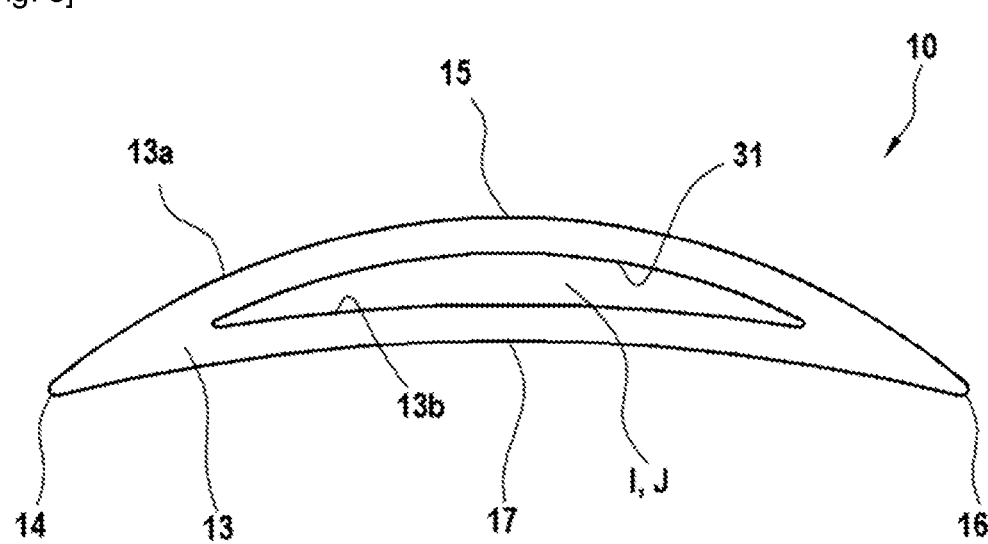
[Fig. 4]
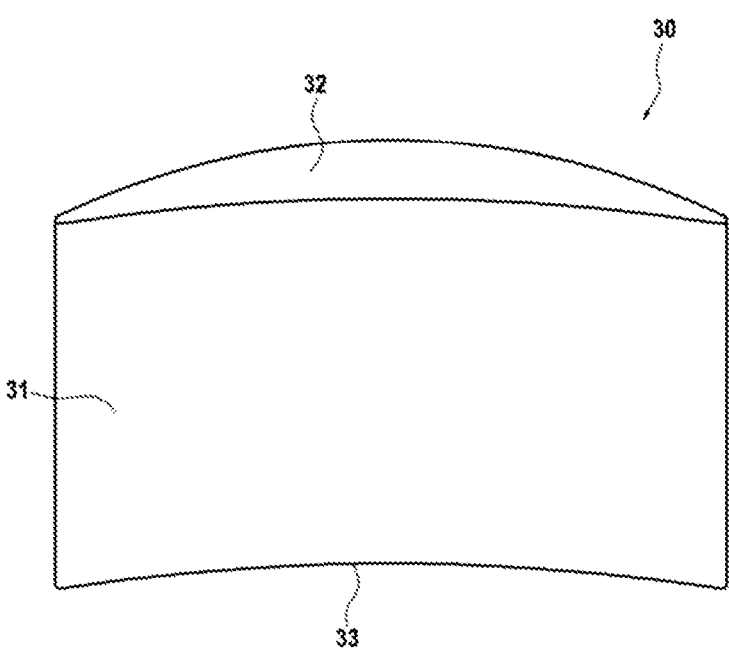

[Fig. 7]
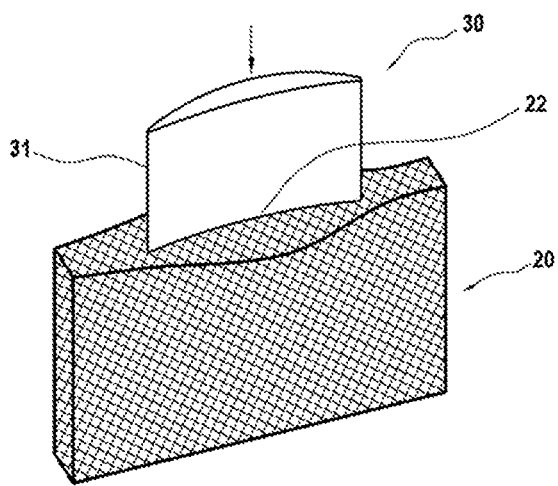
[Fig. 8]
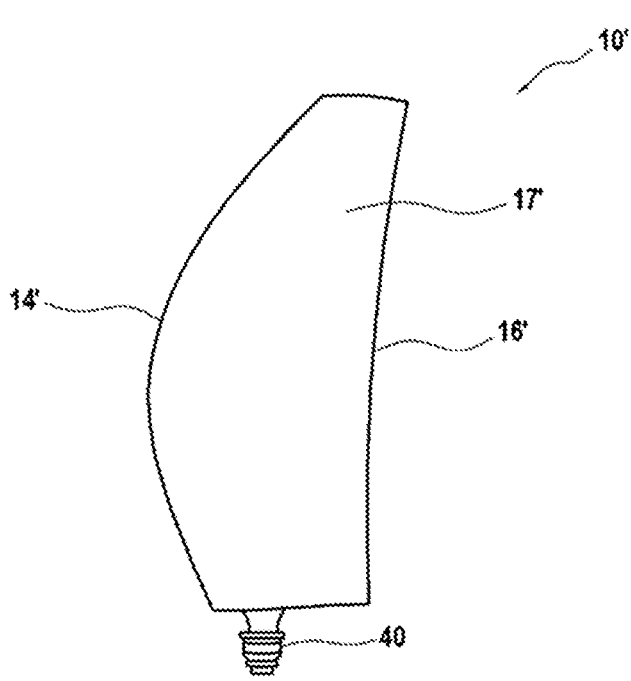

[Fig. 9]
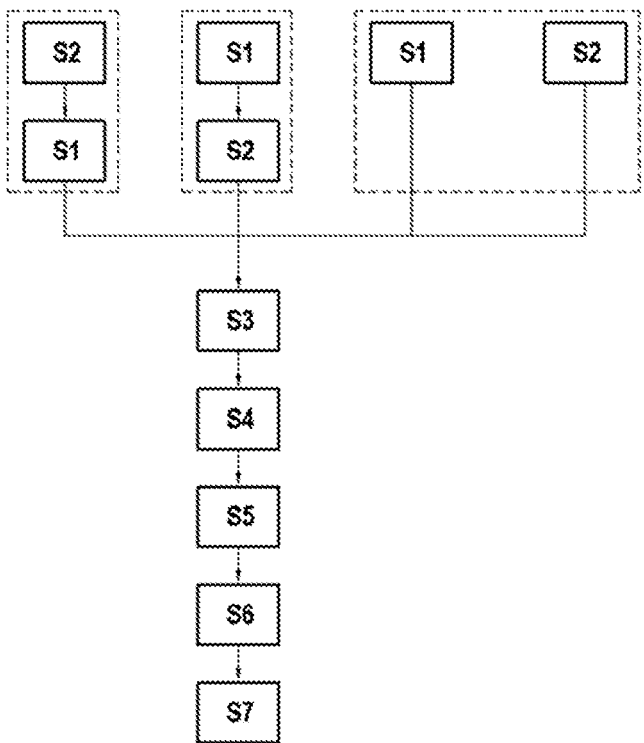
[Fig. 10]

METHOD FOR PRODUCING A PART, IN PARTICULAR A PART MADE FROM A COMPOSITE MATERIAL

CROSS-REFERENCE TO RELATED APPLICATIONS

This is a National Stage Application under 35 U.S.C. § 371 of International Application No. PCT/FR2022/052222, filed Dec. 2, 2022, now published as WO 2023/111419 A1, which claims priority to French Patent Application No. 2113390, filed on Dec. 13, 2021.

TECHNICAL FIELD

The invention relates to the production of parts made from a composite material. More precisely, the invention relates to a method for producing a part, in particular a composite material part, in particular for a blade of an aeronautical turbomachine.

PRIOR ART

Composite material parts are commonly used in aeronautical turbomachines, such as aircraft turbine engines, in order to reduce their mass, while guaranteeing obtaining of desired mechanical properties, in particular, their stiffness. Such composite materials can have a so-called "sandwich" structure, wherein a layer, called a "core" or honeycomb core, also designated by the abbreviation "NIDA", and/or made of foam is inserted between two monolithic composite layers with carbon and/or glass and/or Kevlar fibres.

Such a structure makes it possible to increase the bending stiffness of the part and, in parallel, to control its mass, via the introduction of a low-density material at the core, where the mechanical stresses are low.

However, this type of structure can cause operational problems during production, generate delamination in their skin, in the case of unidirectional plies, or even present poor adhesion at the interface between the composite skin and the NIDA and/or the foam, limiting the maximum usage stresses and their resistance to impact.

The resistance to delamination must be even larger for an application on larger dimension structural parts, such as outlet guide vanes, also designated by the acronym OGV, intended to transmit forces between a gas generator and a nacelle of the turbomachine, and a flow straightener of the secondary air flow of the turbomachine.

In order to overcome such a disadvantage, a solution for this type of part consists of using a fibrous reinforcement produced from a three-dimensional weave, wherein the yarns interlace in a three-dimensional manner, also designated by the term "3D interlock weave", and which is impregnated in a matrix. The matrix is injected by liquid means, for example by vacuum assisted resin transfer moulding, also designated by the acronym VARTM. A low-density inner foam, forming the core, is then inserted into the fibrous reinforcement.

This solution makes it possible to combine the capacity of the three-dimensional weave to prevent the progression of a delamination, with the increase in bending stiffness.

Although providing satisfaction in certain cases, such a solution can present different disadvantages. In particular, in the case of the use of a low-density foam, the core risks being damaged during its insertion inside the fibrous preform. Furthermore, certain geometries impose precise dimensions, in particular on the order of a millimetre, in thickness and/or radius, constituting weak points for the foam. Moreover, the foam is at risk of breaking and/or crumbling during the production of the part. Finally, in the case of the use of a honeycomb structure, the resin used to impregnate the fibrous preform is may fill the cells of the honeycomb, and thus greatly reduce the mass saving of the final part.

DISCLOSURE OF THE INVENTION

The aim of the invention is, in particular, to provide a solution enabling all or some of the above-mentioned disadvantages to be overcome.

This aim is achieved by a method for producing a part, in particular a composite material part, in particular for a turbomachine, comprising at least:

a step of producing a preform, during which a fibrous preform intended to form an outer skin of the part is produced;

a step of producing a core, during which a rigid core, in particular a hollow rigid core, intended to form a framework of the part is produced;

an insertion step, during which the rigid core is inserted into the fibrous preform, an injection step, during which a matrix is injected into the fibrous preform; and a heat-treatment step, during which polymerisation of the matrix is carried out.

It is understood that the rigid core defines a framework and constitutes a structural element of the composite material part. The rigid core thus forms the internal skeleton of the part, enabling it to carry an outer skin. According to exemplary applications, the outer skin can be, in particular, in contact with an air flow flowing in an air flow path, when the part is a turbomachine blade. In other words, the rigid core not only serves to maintain the shape of the dry fibrous preform during impregnation, but also subsequently contributes an internal structure, after the production of the part and during its use.

Thus, unlike the use of inner cores serving to maintain the shape of the fibrous preform during a consolidation step and being intended to be removed at the end thereof, the rigid core according to the disclosed invention remains and acts as a framework for the final part, enabling, in particular, the rigidity thereof to be increased.

The rigid core being preferably hollow, it also makes it possible to improve the mass saving of the part, while making it possible, due to its rigidity, to resist the various stresses of use stresses or production of the part, in particular during an injection of a matrix into the fibrous preform, such as an injection pressure of the matrix, a closure pressure of a mould linked to the compacting of the preform and/or a heat treatment enabling polymerisation of the matrix.

The disclosed production method according to the invention thus makes it possible to obtain a part that is both lighter, due to the absence of an internal structure such as a honeycomb structure or a foam, and having the necessary rigidity to enable it to resist the various stresses of use of the part.

In certain embodiments, the rigid core is produced so as to have a shape equivalent to the composite material part intended to be produced.

The term "having a shape equivalent to the part intended to be produced" is understood to mean that the core is of a shape identical to the final part, reduced by a thickness corresponding to the fibrous preform enveloping the rigid core after the insertion step thereof into the fibrous preform.

For example, when the part is a turbomachine guide vane, the rigid core has, in the same way as the turbomachine guide vane intended to be produced, a leading edge, a trailing edge, an intrados and an extrados, and also has the same aerodynamic profile as the turbomachine guide vane. In other words, the shape of the rigid core is equivalent to the part intended to be produced, but its dimensions are substantially smaller than those of the part intended to be produced, such that when the fibrous preform envelops the core after insertion into the fibrous preform, the dimensions of the final part can be attained.

Thus, the fact of producing a rigid core having a shape equivalent to the part intended to be produced, makes it possible, following the insertion step of the core into the fibrous preform, to shape the latter before the injection of the matrix, without requiring additional parts in order to perform such a shaping. It is thus possible to improve the efficiency of the method for producing the composite material part.

In certain embodiments, the rigid core is a shell comprising at least one side wall enclosing a cavity.

In other words, the rigid core comprises an outer envelope forming the rigid shell enclosing a cavity. The rigid shell is, preferably, closed and sealed. It is understood that the rigid core is hollow in that the cavity does not have any inner element, with the exception of optional stiffeners, unlike a foam or honeycomb structure, enclosing the walls forming the internal cells.

In certain embodiments, the rigid core comprises a thermoplastic and/or thermosetting material. These materials can improve the rigidity of the core.

In certain embodiments, the rigid core comprises a material for which the heat deflection temperature and the glass transition temperature are greater than a polymerisation temperature of the matrix used during the injection step.

Thus, even during the heat treatment enabling polymerisation of the matrix, the rigid core, in particular the side wall thereof, retain the mechanical properties enabling it to resist the various previously-mentioned stresses linked, in particular, to the compacting and the heat treatment.

It should be noted that:

the heat deflection temperature is the temperature above which, for a given filler, a part subjected to bending deforms, and the glass transition temperature is the temperature above which a part passes from a rigid solid state (vitreous) to a rubbery state.

In certain embodiments, the rigid core comprises at least one of the materials from a polyaryletherketone, a polyetherimide and/or a semi-aromatic polyamide.

In certain embodiments, the rigid core can comprise a material filled with fibres, in particular carbon and/or glass fibres. The above-mentioned materials can, in particular, be filled with carbon and/or glass fibres, short and/or long fibres, and nano-materials.

In certain embodiments, the rigid core comprises at least one stiffener. The stiffener can be a wall extending inside the cavity formed by the side wall of the core, from one end to the other of this cavity. The stiffener can improve the rigidity of the core, and thus improve its resistance to various above-mentioned stresses. In order to further improve its rigidity, the core can comprise a plurality of stiffeners extending transversely and/or longitudinally from one end to the other of the cavity of the core. Preferably, the one or more stiffeners are made of the same material as the side wall of the core.

In certain embodiments, the rigid core is formed in a single operation, in particular by additive manufacturing. It is thus possible to produce the core, and optionally the one or more stiffeners, as a single piece. This makes it possible to obtain a hollow sealed part in a single operation. More specifically, in the current case, the shell forming the core is closed and contains no welding or fixation. This makes it possible to limit or even remove the risk of infiltration of the matrix, for example by the resin, into the cavity of the core during injection of the matrix into the fibrous preform.

In certain embodiments, the rigid core is formed in a mould and comprises at least two parts assembled and fixed together, in particular by fusion, welding or glueing. The rigid core can, for example, comprise two half-shells, each produced by injection in a mould, then assembled with one another in order to form a closed shell. The assembly and fixing together of the two half-shells can be carried out by fusion of the edges of each thereof, so as to obtain a sealed shell.

In certain embodiments, the production method comprises, after the production of the rigid core, a surface treatment step during which a surface treatment of the rigid core is carried out, in particular comprising an application of an adhesive on an outer surface of the rigid core.

The adhesive is preferably compatible with the resin used during the injection step. This makes it possible to improve the adherence of the outer surface of the side wall of the core with the outer skin, in other words with the fibrous preform made of three-dimensional woven composite. Alternatively to the surface treatment, the core can be produced in a mould having a significant roughness, in other words having a roughness greater than 0.5 μm, ideally greater than 0.9 μm.

In the case of a rigid core produced in a single operation by additive manufacturing, surface undulations inherent to the method itself, define a surface relief contributing to improving the adherence of the outer surface of the core with the outer skin.

In certain embodiments, the fibrous preform is formed by a fibrous texture produced in a single part by three-dimensional or multilayer weaving or from a plurality of two-dimensional fibrous strata.

In certain embodiments, the fibrous texture is produced from glass, carbon and/or ceramic fibres.

In certain embodiments, the matrix used during the injection is an epoxy-based thermosetting resin or a phenolic resin, such as polybismaleimides. Alternatively, the matrix can be a thermoplastic resin, such as a polyaryletherketone, a polyetherimide and/or a semi-aromatic polyamide.

In certain embodiments, the production method comprises a finishing step during which the part is adjusted to the desired dimensions.

In certain embodiments, the insertion step comprises insertion of a spar into the rigid core, providing better bending rigidity to the flexion in the lower portion of the part to be produced.

In certain embodiments, the part to be produced is a turbomachine blade, in particular an outlet guide vane.

In certain embodiments, the part to be produced is an aircraft propeller, in particular a propeller of a turboprop engine or of an unducted fan engine.

The disclosed invention also relates to a composite material part obtained by a production method according to any one of the preceding embodiments.

The disclosed invention also relates to a turbomachine comprising a composite material part according to the disclosed invention.

BRIEF DESCRIPTION OF THE FIGURES

The invention and its advantages will be better understood on reading the following detailed description of various embodiments on the invention presented by way of non-limiting examples. This description refers to the attached pages of figures, in which:

FIG. 1 is a schematic sectional view of an aeronautical turbomachine,

FIG. 2 is perspective view of two isolated outlet guide vanes of the turbomachine of FIG. 1, according to a first embodiment of the invention, FIG. 3 is a sectional view, through the sectional plane B-B, of an outlet guide vane of FIG. 2, FIG. 4 is a perspective view of a hollow rigid core according to the first embodiment, FIG. 5 is longitudinal sectional view of the hollow rigid core of FIG. 4, FIG. 6 is perspective schematic view showing a fibrous preform before shaping, FIG. 7 is a perspective schematic view representing the insertion of the hollow rigid core of FIG. 4 into the fibrous preform of FIG. 6, FIG. 8 is a sectional view, through a radial sectional plane, of a propeller according to a second embodiment of the invention, FIG. 9 is a schematic view representing the fibrous preform coated with carbon foam, after the heat treatment, and FIG. 10 is a flow diagram of the steps of a method for producing a composite material part conforming with the invention.

DESCRIPTION OF THE EMBODIMENTS

In the rest of the disclosure, the terms "outer", "inner" and they derivatives are considered with reference to a hollow structure of a rigid core and/or of a part to be produced. For example, when the part to be produced is an outlet guide vane, an inner surface corresponds to a surface directed towards the interior of a cavity of the part and/or of the core, and/or an outer surface corresponds to a surface directed towards the exterior of the cavity of the part and/or of the core.

FIG. 1 schematically represents a longitudinal sectional view of a turbomachine 1, in particular an aeronautical turbomachine 1. In particular, in FIG. 1, the turbomachine 1 is a turbofan engine centred on a longitudinal axis A-A.

The turbomachine 1 includes, from upstream to downstream in a flow direction of the gaseous flow F in the turbomachine 1, a fan 2, a low-pressure compressor 3, a high-pressure compressor 4, a combustion chamber 5, a high-pressure turbine 6, and a low-pressure turbine 7.

The fan 2 comprises, in particular, a rotating disc 8 on which are mounted a plurality of fan blades 9 between which attached platforms are present (not shown). The function of each platform is to delimit, to the interior with respect to the longitudinal axis A-A of the turbomachine 1, a gas flow path to the interior of the turbomachine 1 and to ensure the sealing of the flow path between the fan blades 9 of the fan 2.

Output guide vanes 10 are arranged downstream of the fan blades 9 of the fan 2 and extend around of the longitudinal axis A-A through a secondary flow path, in order to straighten a secondary air flow. According to the disclosed invention, in particular the output guide vanes 10 are made of a composite material with a fibrous reinforcement embedded in a matrix.

FIG. 2 schematically shows two output guide vanes 10, isolated from the rest of the turbomachine 1. The output guide vanes 10 extend radially between a casing 11 of the turbomachine and a nacelle 12. The output guide vanes 10 respectively comprise a leading edge 14, a trailing edge 16, between which extends an extrados 15 and an intrados 17.

FIG. 3 shows the inner structure of an outlet guide vane 10, in a radial sectional plane B-B of FIG. 2. The outlet guide vane 10 has a hollow structure and comprises, more precisely, an outer skin 13. More particularly, an outer surface 13a of the outer skin 13 defines the aerodynamic profile of the outlet guide vane 10, and an inner surface 13b of the outer skin 13 defines an inner cavity I. It should be noted that, in FIG. 3, the inner cavity I of the outlet guide vane 10 is coincident with an inner cavity J of a rigid core 30 which is described below.

FIG. 4 shows a perspective view of a hollow rigid core 30 according to the disclosed invention. According to a particular exemplary embodiment, the rigid core 30 is a closed rigid shell, preferably sealed, comprising a side wall 31, an upper wall 32 and a lower wall 33. The side wall 31, the upper wall 32 and the lower wall 33 delimit a volumetric shape defining the cavity J of the rigid core 30, which is not visible in FIG. 4.

The rigid core 30 is intended to form a framework of a part to be produced, in particular the outlet guide vane 10.

Advantageously, the side wall 31, the upper wall 32 and the lower wall 33 comprise a thermoplastic and/or thermosetting material, for example polyaryletherketone, polyetherimide and/or a semi-aromatic polyamide. Such materials can be filled with short or long fibres, in particular glass fibres or carbon fibres, for example.

The side wall 31, the upper wall 32 and the lower wall 33 can have a thickness of at least 0.2 mm. The material is, preferably, chosen so that it possesses a heat deflection temperature HDT and a glass transition temperature Tg greater than a polymerisation temperature of the matrix used during the injection step described below, preferably a glass transition temperature Tg at least 20° C. greater than a polymerisation temperature of the matrix used. For example, the matrix used during the injection step is the resin marketed by Solvay under the name PR520®.

Preferably, the material can have a polymerisation temperature between 170° C. and 200° C., the heat deflection temperature HDT and the glass transition temperature Tg of the material may be at least 220° C.

It is also possible to use a thermoplastic material having a glass transition temperature Tg less than the polymerisation temperature of the matrix used during the injection. In such a case, a high heat deflection temperature HDT is required. For example, the following can be used:

a polyaryletherketone having a glass transition temperature Tg of 143° C. and a heat deflection temperature HDT of 315° C., or a polyaryletherketone having a glass transition temperature Tg of 55° C. and a heat deflection temperature HDT of 252° C.

Figures 5, 6:
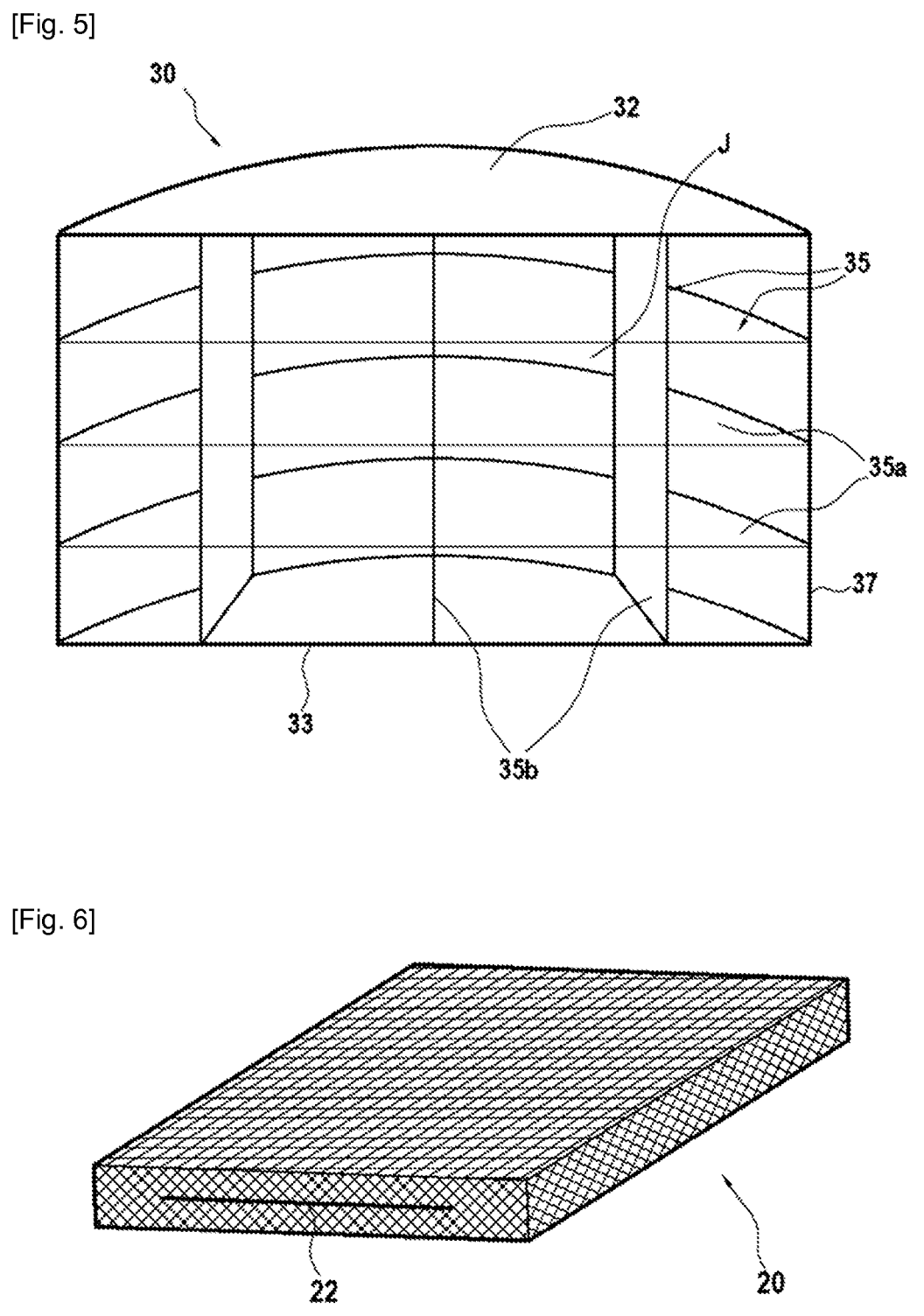

FIG. 5 shows a sectional view of the rigid core 30, through a vertical sectional plane with respect to FIG. 4, corresponding to a longitudinal, in other words radial, direction of the outlet guide vane 10. This section makes it possible to distinguish the inner cavity J of the rigid core 30.

In addition, according to this example, the rigid core 30 comprises a plurality of stiffeners 35 disposed in the inner cavity J.

In particular, the rigid core 30 comprises a plurality of horizontal stiffeners 35a stacked one above the other, being spaced apart from one another, preferably at regular intervals along a vertical direction. The rigid core 30 also comprises a plurality of vertical stiffeners 35b disposed perpendicularly to the horizontal stiffeners 35a, and spaced apart from one another, preferably at regular intervals in a direction perpendicular to the vertical direction.

Each of the horizontal stiffeners 35a, and respectively each of the vertical stiffeners 35b, has a flat plate shape extending from one end to the other of the cavity J of the rigid core 30, being in contact with the upper wall 32 and the lower wall 33 and/or the side wall 31.

In such a configuration, due to the presence of the stiffeners 35, the inner cavity J of the rigid core 30 is subdivided into a plurality of cavities. Preferably, the horizontal stiffeners 35a and the vertical stiffeners 35b are formed as a single piece with the side wall 31, the upper wall 32 and the lower wall 33, made of a same material as these.

The horizontal stiffeners 35a and the vertical stiffeners 35b can improve the rigidity of the side wall 31, the upper wall 32 and/or the lower wall 33, and, consequently, of the rigid core 30.

It should be noted that the shape, the number and arrangement of the horizontal stiffeners 35a and/or vertical stiffeners 35b in the inner cavity J of the rigid core 30 are not limited; different configurations from that illustrated in FIG. 5 are possible, depending in particular on the part considered and the production stresses.

Thus, each of the output guide vanes 10 comprises a rigid core 30 disposed in the inner cavity I, around which is disposed the outer skin 13 of the outlet guide vane 10. The rigid core 30 makes it possible to lighten the outlet guide vane 10 while ensuring its rigidity, in particular by contributing to the bending and torsion forces.

It should be noted that, for the purposes of visibility, the side wall 31 of the rigid core 30 and the inner wall 13b of the outer skin 13 are coincident in FIG. 3, and the stiffeners 35 are not shown.

A first embodiment of a production method conforming to the disclosed invention relates to a composite material part, in particular the outlet guide vane 10 previously described. The first embodiment of a production method conforming to the invention will be described with reference to FIGS. 6, 7 and 10.

A fibrous preform 20, or fibrous reinforcement 20, shown in FIG. 6 is intended to form the outer skin 13 of the outlet guide vane 10. The production method conforming to the invention provides a step of producing a preform S1 during which the fibrous preform 20 is produced.

The fibrous preform 20 is preferably produced from a three-dimensional weave in which the yarns interlace in a three-dimensional manner, also known as "3D interlock" weave. However, other three-dimensional or multilayer weaves can be used such as, for example, multi-plain or multi-satin weaves.

The production of such a fibrous preform is known to a person skilled in the art and will not be described in detail in the present disclosure. Reference can be made, in particular, to document WO 2006/136755.

It should however be noted that the fibrous preform 20 comprises a non-interlinked area 22, in particular extending over all or part of a length of the fibrous preform 20. Such a configuration makes it possible to locally separate, in the non-interlinked area 22, two parts of the fibrous preform 20. An opening thus created by the separation of the two parts of the fibrous preform 20 enables a subsequent insertion of the rigid core 30.

The production method conforming to the invention also provides a production step of a core S2 during which a core is produced. The core production step S2 enables, in particular, the obtaining of the rigid core 30 as previously described.

It should be noted that the core production step S2 is not necessarily carried out after the preform production step S1. Indeed, the production of the fibrous preform 20 can be produced before the rigid core 30, after the rigid core 30 or in parallel with the rigid core 30. In other words, the preformed production step S1 and core production step S2 are interchangeable or simultaneous, as shown schematically in FIG. 10.

The rigid core 30 can be formed by additive manufacturing enabling production, in a single operation and in one piece, of the side wall 31, the upper wall 32, the lower wall 33 and/or the stiffeners 35, in particular the horizontal stiffeners 35a and/or the vertical stiffeners 35b as applicable. Such a production mode makes it possible to obtain a sealed shell, formed by the side wall 31, the upper wall 32 and the lower wall 33, making it possible to avoid the introduction of resin into the inner cavity J of the rigid core 30.

Alternatively, the rigid core 30 can be produced by moulding in a mould provided for this purpose. In particular, the mould can be produced in two parts, in other words in two half-shells, each half-shell having a shape equivalent to the section shown in FIG. 5. The two half-shells are then assembled and fixed together, in particular by fusion, welding or glueing of an edge 37 of each half-shell.

Whatever the production mode used, the rigid core 30 is produced so as to have a shape equivalent to the shape of the part intended to be produced, such as, according to the example presented, the outlet guide vane 10. In particular, in the same way as the outlet guide vane 10 intended to be produced, the rigid core 30 has a leading edge, a trailing edge, an intrados and an extrados, and has an aerodynamic profile equivalent to that of the outlet guide vane 10, in particular an equivalent camber.

The production method conforming to the invention can also provide a surface treatment step S3 during which a surface treatment of the rigid core 30 is carried out. The surface treatment step S3 can improve the adherence of an outer surface of the rigid core 30 with the fibrous preform 20.

In particular, the surface treatment can comprise the application of an adhesive on the outer surface of the rigid core 30, chosen so as to be compatible with a resin used during an injection step S5 which will be described below.

Alternatively, the rigid core 30 can be produced in a mould having a significant roughness, in particular having a roughness Ra greater than 0.5 µm, in particular a roughness Ra greater than 0.9 µm.

The production method conforming to the invention can also provide an insertion step S4 during which the rigid core 30 obtained, in particular, in the core production step S2, is inserted into the fibrous preform 20 obtained, in particular, during the preform production step S1.

More precisely, the two parts of the fibrous preform 20 are separated at the non-interlinked area 22, so as to be able to insert the rigid core 30 there. Thus, at the end of the insertion step S4, given the shape of the rigid core 30, the fibrous preform 20 itself takes the shape of the rigid core 30 and, consequently, the desired shape of the final part.

The final part is obtained after finishing steps, which may be necessary at the end of the production method according to the invention.

In particular, in the case of the outlet guide vane 10 according to the present embodiment, the fibrous preform 20 disposed around the rigid core 30 adopts the curvature and camber of the final part. The rigid core 30 thus acts as a structural element of the final part, constituting the framework of the outlet guide vane 10, enabling shaping during production, and withstanding the various stresses which are applied to it during production and/or during use of the outlet guide vane 10. The hollow structure, through the presence of the stiffeners 35 if applicable, also makes it possible to lighten the outlet guide vane 10 thus obtained.

An intermediate compacting step may be carried out. Such an intermediate compacting step enables a pressure to be applied on the fibrous preform 20 so as to press the latter against the side wall 31 of the rigid core 30.

In a particularly advantageous manner, the pressure applied in the intermediate compacting step is, preferably, maintained during the injection step S5 which will be described below. In doing so, the inner wall 13*b* of the outer skin 13 of the final part uniformly matches the side wall 31 of the rigid core 30. This makes it possible to obtain the configuration illustrated in FIG. 3.

The production method conforming to the invention can also provide the injection step S5 during which a matrix is injected into the fibrous preform 20. The injection step S5 enables densification and solidification of the part.

In order to do this, the rigid core 30/fibrous preform 20 assembly is preferably disposed and held in a shaping tool (not shown). Such a holding in the shaping tool is ensured, at least until rigidification (or solidification) of the fibrous preform 20. The shaping tool, for example an injection mould, can also enable the compacting mentioned above. The compacting is therefore, in such a particular mode, carried out in parallel with the injection during the injection step S5.

The matrix is chosen depending on the intended application. This may be a thermosetting or thermoplastic resin. For example, for the production of the outlet guide vane 10, an organic matrix can be obtained, in particular, from a polymer matrix precursor resin, such as an epoxy, bismaleimide or polyimide resin.

In the case of an organic matrix, the fibrous preform 20 is impregnated by a composition containing the matrix precursor resin, before or after arrangement and compacting in the shaping tool. The impregnation can be carried out, for example, by infusion or by a vacuum assisted resin transfer moulding VARTM method in a suitable mould.

The production method conforming to the invention can also provide a heat treatment step S6 during which polymerisation, or curing, of the resin is carried out. During the heat treatment step S6, the rigid core 30/fibrous preform 20 assembly is heated. The heat treatment step S6 thus makes it possible to cure the resin and to obtain the final rigid part.

Finally, the production method conforming to the invention can also provide a finishing step S7 during which the part is adjusted to the desired dimensions, for example by machining. The finishing step S7 makes it possible, in particular, to obtain the outlet guide vane 10 shown in FIGS. 2 and 3.

A second embodiment of a production method conforming to the disclosed invention is described with reference to FIGS. 8 and 9. In the second embodiment of a production method, the composite material part is an aircraft propeller

10', for example a propeller 10' of a turboprop engine or of an unducted engine, for example.

The propeller 10' comprises a leading edge 14', a trailing edge 16', an extrados 15' and an intrados 17'. The propeller 10' differs structurally from the outlet guide vane 10 of the first embodiment, in particular, in that it comprises a root 40, in particular a tulip-shaped root 40, and a longitudinal spar 42 arranged at the core of the propeller 10', in particular in the inner cavity formed by an outer skin 13' of the propeller 10', and passing radially through it.

The outer skin 13' of the propeller 10' comprises an outer surface 13*a*', in particular in contact with an exterior air flow, and an inner surface 13*b*', in particular forming an inner cavity of the propeller 10'.

The steps of the production method according to the second embodiment are substantially identical to the production method of the first embodiment and will not be described again.

In particular, the production method according to the second embodiment also comprises the production of a rigid core 30', comprising a side wall 31' intended to be in contact with the inner wall 13*b* of the outer skin 13' of the propeller 10'.

It will be noted that, in the example illustrated in FIG. 8, the rigid core 30' comprises at least one longitudinal stiffener 35*a*' disposed vertically, in other words in the longitudinal direction of the propeller 10', and extending along a chord of the rigid core 30' from the leading edge 14' to the trailing edge 16' of the rigid core 30'. Furthermore, the rigid core 30' comprises a plurality of vertical stiffeners 35*b*' disposed vertically and extending transversely, in the present case substantially perpendicular to the longitudinal stiffener 35*a*'.

The rigid core 30' is intended to be a framework of a part to be produced, in particular the propeller 10'.

Analogously to the first embodiment, the arrangement of longitudinal stiffener 35*a*' and vertical stiffeners 35*b*' is not limiting. Other arrangements which can improve the rigidity of the rigid core 30' are possible. Horizontal stiffeners can also be provided.

The production method according to the second embodiment differs from the production method according to the first embodiment, in particular, in that during the production of the rigid core 30', for example by additive manufacturing, it is necessary to provide an inner recess 38'. The inner recess 38' makes it possible to define a space intended to receive the spar 42. Thus, the insertion step S4 during which the rigid core 30' is inserted into the fibrous preform 20 also comprises an insertion of the spar 42 into the rigid core 30', more precisely into the inner recess 38' of the rigid core 30'.

Although the present invention has been described by referring to specific exemplary embodiments, it is obvious that modifications and changes can be made to these examples without going beyond the general scope of the invention as defined by the claims. In particular, the individual features of different embodiments illustrated or mentioned can be combined in additional embodiments. Consequently, the description and the drawings should be considered as illustrating rather than limiting.

It is also obvious that all the features described in reference to a production method can be transposed, alone or in combination, to a device, and inversely, all the features described in reference to a device can be transposed, alone or in combination, to a production method.

The invention claimed is:

1. A method for producing a part, made of composite material, for a turbomachine, comprising at least:

a step of producing a preform, during which a fibrous preform intended to form an outer skin of the part is produced;

a step of producing a core, during which a hollow rigid core, intended to form a framework of the part is produced, the hollow rigid core comprising an inner cavity subdivided into a plurality of cavities by stiffeners, and further comprising an inner recess defining a space intended to receive a spar;

an insertion step, during which the hollow rigid core is inserted into the fibrous preform and during which a spar is inserted into the inner recess of the hollow rigid core, an injection step, during which a matrix is injected into the fibrous preform; and a heat-treatment step, during which polymerisation of the matrix is carried out.

2. The method for producing a part according to claim 1, wherein the hollow rigid core is produced so as to have a shape equivalent to the composite material part intended to be produced.

3. The method for producing a part according to claim 1, wherein the hollow rigid core is a shell comprising at least one side wall enclosing a cavity.

4. The method for producing a part according to claim 1, wherein the hollow rigid core comprises a thermoplastic and/or thermosetting material.

5. The method for producing a part according to claim 1, wherein the hollow rigid core comprises a material for which a heat deflection temperature and a glass transition temperature are greater than a polymerisation temperature of the matrix used during the injection step.

6. The method for producing a part according to claim 1, wherein the hollow rigid core comprises at least one of the materials from a polyaryletherketone, a polyetherimide and/or a semi-aromatic polyamide.

7. The method for producing a part according to claim 1, wherein the hollow rigid core is formed:

in a single operation, by additive manufacturing, or in a mould and comprises at least two parts assembled and fixed together, by fusion, welding or gluing.

8. The method for producing a part according to claim 1, comprising, after the step of producing the core, a surface treatment step, during which a surface treatment of the hollow rigid core is carried out, in particular comprising application of an adhesive on an outer surface of the hollow rigid core.

9. The method for producing a part according to claim 1, comprising a finishing step, during which the part is adjusted to the desired dimensions.

10. The method for producing a part according to claim 1, wherein the part to be produced is a turbomachine blade.

11. The method of producing a part according to claim 1, wherein the stiffeners include first stiffeners spaced apart from one another along a first direction.

12. The method of producing a part according to claim 11, wherein the stiffeners include second stiffeners spaced apart from one another along a second direction perpendicular to the first direction.

13. The method of producing a part according to claim 12, wherein the hollow rigid core includes a side wall, an upper wall, and a lower wall, wherein the vertical stiffeners and the horizontal stiffeners are formed as a single piece with the side wall, the upper wall, and the lower wall.

14. The method of producing a part according to claim 12, wherein the fibrous preform includes a non-interlinked area extending over a part of a length of the fibrous preform.

15. The method for producing a part according to claim 1, wherein the fibrous preform is formed by a fibrous texture produced in a single part by three-dimensional or multilayer weaving.

16. The method of producing a part according to claim 1, wherein the method further comprises:

a compacting step, during which pressure is applied to the fibrous preform to press the fibrous preform against a side wall of the hollow rigid core.

\* \* \* \* \*